2,972,612
Patented Feb. 21, 1961

2,972,612

PHENTHIAZINE COMPOUNDS

Robert Michel Jacob, Ablon-sur-Seine, and Jacques Georges Robert, Paris, France, assignors to Societe des Usines Chimiques Rhone-Poulenc, Paris, France, a corporation of France No Drawing. Filed Apr. 1, 1958, Ser. No. 725,499

Claims priority, application Great Britain May 13, 1955

3 Claims. (Cl. 260—243)

This invention relates to anti-histaminic drugs and to therapeutic compositions containing the same, this application being a continuation-in-part of application Serial No. 617,235, filed on October 22, 1956, now Patent No. 2,837,518, granted June 3, 1958, itself a continuation-in-part of applications Serial No. 545,103, filed November 4, 1955, and Serial No. 549,174, filed November 25, 1955, both of which latter applications were abandoned.

It is known that various 10-aminoalkyl phenthiazines possess interesting therapeutic properties. Extensive research and experimentation has shown, however, that both the size of the therapeutic index and the nature of the therapeutic effect exhibited by certain compounds of this type can radically be changed (even eliminated) by even small changes in chemical structure. Especially is this the case with variations in the nature and length of the side chain attached to the 10-position nitrogen atom and with substitution in the phenthiazine nucleus.

It is the object of this invention to provide new phenthiazine compounds which have a powerful and specific anti-histaminic activity with substantial absence of effects on the central nervous system. It is a further object of the invention to provide new anti-histaminic compositions which, in comparison with known anti-histaminic compositions of comparable anti-histaminic activity, possess the advantage—for which there is a definite clinical need—that they can be employed under conditions when a secondary effect upon the central nervous system is contra-indicated.

Among phenthiazines heretofore used clinically as anti-histaminics one of the most active and most widely used is 1-(10-phenthiazinyl)-2-dimethylaminopropane (Promethazine). This compound is, however, not without undesirable side effects which militate against its use in certain cases. There is, therefore, a need for a compound capable of being used clinically which is free from those side effects.

In our application Serial No. 617,235 we have disclosed inter alia 3-(10-phenthiazinyl)-2-methyl-1-dimethylaminopropane as a compound combining both anti-histaminic and central nervous action in a degree greater than that of any compound of the prior art. This unusual combination of properties gives this compound certain valuable clinical uses, but this compound cannot satisfactorily be used in circumstances where it is important to avoid action on the central nervous system.

According to the present invention it has now been unexpectedly discovered that 3-(9:9-dioxy-10-phenthiazinyl)-2-methyl-1-dimethylaminopropane, which differs in structure from the compound mentioned above of our application Serial No. 617,235 only in the presence of two oxygen atoms attached to the sulphur atom of the molecule, possesses (as such or in the form of a salt) marked anti-histaminic activity comparable with that of the above-named compounds, 1-(10-phenthiazinyl)-2-dimethylaminopropane and 3-(10-phenthiazinyl)-2-methyl-1-dimethylaminopropane, combined with weaker central nervous activity than either.

The compound of the present invention therefore presents advantages (viz. absence of side effects) over the aforesaid compounds of related chemical structure which make it very suitable for clinical use as a specific antihistaminic.

The unexpected properties of the compound of the invention are demonstrated by the following tests:

(a) TOXICITY

The dose of product which, when administered to mice subcutaneously (s.c.) on the one hand and orally (p.o.) on the other hand, produces the death of 50% of the treated animals after 3 days is sought. This dose is called $LD_{50}$ (lethal dose for 50% of the animals).

(b) THE BOVET-STAUB TEST FOR ANTI-HISTAMINIC ACTIVITY

The number of toxic doses of histamine, administered intravenously, which can be supported by guinea pigs treated 30 minutes previously with 20 mg./kg. of the test compound by subcutaneous injection, is determined.

(c) THE SCHAUMANN TEST FOR ANTI-HISTAMINIC ACTIVITY

There are determined:

(1) The minimum dose of product, expressed in mg./kg. (s.c.) and (p.o.) which protects 50% of the guinea pigs for 10 minutes against bronchospasm produced by histamine aerosols ($DA_{50}$).

(2) The minimum dose of product, expressed in mg./kg. (s.c.) and (p.o.) which completely suppppresses the symptoms produced by the histamine aerosols in 100% of the guinea pigs treated ($DE_{100}$). The duration of the total protection expressed in hours is shown in brackets in the table below.

(d) SEDATIVE ACTION MEASURED AS THE POTENTIATION OF HEXOBARBITAL

The product to be studied is administered subcutaneously to the test animal (mouse) in a dose of 20 mg./kg.; thirty minutes later, hexabarbital is intravenously administered in a dose of 50 mg./kg. The average duration of the narcosis in minutes is noted.

(e) SEDATIVE ACTION MEASURED AS THE ABILITY TO TRANQUILLIZE FIGHTING MICE

Two male mice, aged 6 months and weighing from 30 to 35 g., are brought together. The control animals (untreated) fight in the following 10 seconds. The treated animals are observed for 20 minutes. The time in minutes elapsing before the start of the fight is noted. This time is multiplied by 5 and the percentage of protection is thus obtained (example: fight after 4 minutes=20% protection—fight at the end of 20 minutes, or no fight=100% protection).

The coefficient of 1% is given to the controls (fight in the first 10 seconds).

5 to 6 pairs per dose are used and the dose which gives a 50% protection to the treated animals ($DE_{50}$) is determined for administration s.c. and for administration p.o.

(f) THE WINTER AND FLATAKER TEST

This test is described in J. Pharm. Exp. Ther. 103, 93, (1951). There is determined graphically, by comparison with controls, the dose, in mg./kg. which, administered per os 1½ hours before the test, reduces the spontaneous activity of the mice by 50%. This dose, identified as $DE_{50}$ is shown in the table which follows.

(g) TRACTION TEST

The dose which prevents 50% of the mice treated orally ($DA_{50}$) from effecting a recovery on a horizontally stretched wire is sought.

ANTI-EMETIC ACTIVITY

The protection imparted by the products to be tested on the vomiting produced in the dog by apomorphine is ascertained by the method of C. Chen and Ch. Ensor [J. Pharmacol. 98, 245 (1950)]. For this purpose the products are subcutaneously administered in doses of 2 and 20 mg./kg. thirty minutes before the subcutaneous injection of 0.1 mg./kg. of apomorphine (dogs previously found to be responsive to the action of apomorphine are used). The average number of vomiting bouts occurring during the thirty minutes following the injection of the apomorphine is determined for each product and the percentage reduction as compared with the control animals was deduced.

The results obtained are summarised in the following table where I is 3-(9:9-dioxy-10-phenthiazinyl)-2-methyl 1-dimethylaminopropane (the compound of the present invention) and II and III are 1-(10-phenthiazinyl)-2-dimethylaminopropane and 3-(10-phenthiazinyl)-2-methyl-1-dimethylaminopropane, respectively.

Table

| Test | Animals | Dose, mg./kg. | Method of Administration | Products | | |
|---|---|---|---|---|---|---|
| | | | | I | II | III |
| (a) Toxicity LD$_{50}$ (in three days) | Mice | LD$_{50}$ | s.c. | 295 | 280 | 300. |
| | | LD$_{50}$ | p.o. | 225 | 250 | 300. |
| (b) Antihistaminic activity: Bovet-Staub test. | Guinea pigs | 20 | s.c. | 1,300 | 1,200 | 1,500. |
| (c) Antihistaminic activity: Schaumann test. | Guinea pigs | DA$_{50}$ | s.c. | 0.025 | 0.100 | 0.100. |
| | | DE$_{100}$ | s.c. | 0.500 (3 h.) | 0.500 (6 h.) | 1 mg. (4 h.). |
| | Guinea pigs | DA$_{50}$ | p.o. | 0.250 | 0.500 | 0.150. |
| | | DE$_{100}$ | p.o. | 2.5 (2 h.) | 2.0 (4 h.) | 2 mg. (2 h.). |
| (d) Sedative action: potentiation of hexobarbital. | Mice | 20 | s.c. | 28 min | 45 min | 89 min. |
| (e) Sedative action: tranquillizing fighting mice. | Mice | DE$_{50}$ | s.c. | More than 50 | 20.0 | 3.5. |
| | Mice | DE$_{50}$ | p.o. | More than 50 | 35.0 | 9.0. |
| (f) Winter and Flataker test | Mice | DE$_{50}$ | p.o. | More than 80.0 | 47.0 | 3.5. |
| (g) Traction test | Mice | DA$_{50}$ | p.o. | More than 100.0 | 95.0 | 15.0. |
| (h) Anti-emetic activity | Dog | 20 | s.c. | 0% | 66% | |
| | | 2 | s.c. | | | 65%. |

The results given in this table clearly show that compound I has a high anti-histaminic activity and low toxicity of the same order as those of compounds II and III, but has much lower activity in its other physiological actions, such as anti-emetic effect and sedative action. This highly specific action makes it even more suitable for use clinically as an anti-histaminic than compound II, up till now very widely used for this purpose.

For therapeutic purposes the compound of the invention may be employed as such or in the form of acid addition salts containing anions which are relatively innocuous to the animal organism in therapeutic doses of the salts (such as the hydrochloride and other hydrohalides, phosphate, nitrate, sulphate, maleate, fumarate, citrate, tartrate, methanesulphonate and ethanedisulphonate) so that the beneficial physiological properties inherent in the base are not vitiated by side-effects ascribable to the anion. Similarly, it may also be employed in the form of quaternary ammonium salts obtained by reaction with organic halides (e.g. methyl or ethyl iodide, chloride or bromide or allyl or benzyl chloride or bromide) or other reactive esters, e.g., toluene-p-sulphonate.

3-(9:9-dioxy-10-phenthiazinyl)-2-methyl-1-dimethylaminopropane may be prepared by oxidising 3-(10-phenthiazinyl)-2-methyl-1-dimethylaminopropane by various methods, including (a) the employment of hydrogen peroxide in the presence of acetic acid and (b) reaction with nitric acid. The use of hydrogen peroxide in glacial acetic acid is preferred. The salts may be prepared by known methods, such as the reaction between the base and the requisite acid.

According to a feature of the invention, there are provided anti-histaminic compositions which comprise a member of the class consisting of 3-(9:9-dioxy-10-phenthiazinyl)-2-methyl-1-dimethylaminopropane and its therapeutically acceptable salts, in association with a pharmaceutical diluent. In clinical practice the compounds of the present invention will normally be administered orally, in consequence of which the preferred formulations are those of the kind suitable for oral administration.

Preparations for oral ingestion can be liquids or solids or any combination of these forms, such as solutions, suspensions, syrups, elixirs, emulsions, powders or tablets. Pharmaceutical preparations for administration of the active therapeutic agents in unit dose form can take the form of compressed powders (or tablets) or of a powder enclosed in a suitable capsule of absorbable material such as gelatin. These compressed powders (or tablets) can take the form of the active materials admixed with suitable excipients and/or diluents such as starch, lactose, stearic acid, magnesium stearate or dextrin.

In yet a further embodiment, the active material may, as such or in the form of a diluted composition, be put up in powder packets and employed as such.

Preparations for parenteral administration may be sterile solutions or suspensions in water or other liquids, with or without the addition of soluble or insoluble diluents and/or solid or liquid excipients.

The percentage of active ingredient in the compositions of the invention may be varied, it being necessary that it should constitute a proportion such that a suitable dosage shall be obtained. Obviously several unit dosage forms may be administered at about the same time. In general oral preparations will normally contain at least 0.1% by weight of active substance.

The invention is illustrated by the following examples:

EXAMPLE I 3-(10-phenthiazinyl)-2-methyl-1-dimethylaminopropane (11.9 g.) is dissolved with agitation in glacial acetic acid (120 cc.). Pure sulpuhric acid (d=1.83; 0.5 cc.) is added and a mixture of glacial acetic acid (10 cc.) and hydrogen peroxide (8.5 cc. of a solution containing 38 g. of hydrogen peroxide in 100 cc.) is then run in over 20 minutes. The temperature rises from 25–35° C. and is then kept at 60° C. for 18 hours. The mixture is cooled and water (150 cc.) is added and, with cooling, aqueous sodium hydroxide (d=1.33; 220 cc.). The resulting mixture is extracted with ethyl acetate (3×100 cc.), the solvent is evaporated on a water bath and the residue is recrystallised from heptane (150 cc.). 3-(9:9-dioxy-10-phenthiazinyl)-2-methyl-1-dimethylaminopropane (7.8 g.) is obtained, M.P. 115° C.

The corresponding hydrochloride prepared in ethyl acetate and recrystallised from a mixture of ethanol and isopropanol melts at 250° C.

EXAMPLE II

Tablets of the formula:

| | |
|---|---|
| 3 - (9:9 - dioxy - 10 - penthiazinyl) - 2 - methyl-1-dimethylaminopropane hydrochloride | 0.0112 g. (0.010 g. of base). |
| Starch | 0.1058 g. |
| Diatomaceous earth | 0.0300 g. |
| Magnesium stearate | 0.0030 g. | are prepared according to the usual procedure for the preparation of tablets for pharmaceutical use.

We claim:
1. A member of the class consisting of 3-(9:9-dioxy-10-phenthiazinyl)-2-methyl-1-dimethylaminopropane and its therapeutically acceptable acid addition salts.
2. 3 - (9:9-dioxy-10-phenthiazinyl)-2-methyl-1-dimethylaminopropane.
3. 3 - (9:9-dioxy-10-phenthiazinyl)-2-methyl-1-dimethylaminopropane hydrochloride.

References Cited in the file of this patent

UNITED STATES PATENTS

| | | |
|---|---|---|
| 2,512,520 | Cusic | June 20, 1950 |
| 2,519,886 | Charpentier | Aug. 22, 1950 |
| 2,530,451 | Charpentier | Nov. 21, 1950 |
| 2,645,640 | Charpentier | July 14, 1953 |
| 2,785,160 | Jacob et al. | Mar. 12, 1957 |
| 2,837,518 | Jacob et al. | June 3, 1958 |

FOREIGN PATENTS

| | | |
|---|---|---|
| 782,431 | Great Britain | Sept. 4, 1957 |

OTHER REFERENCES

Viaud: J. Pharmacy and Pharmacol., vol. 6 (1954), pp. 361 and 364.

Kano et al.; Pharm. Bull (Tokyo), vol. 5 (June 1957), pp. 389-393.